United States Patent
Crandall

(10) Patent No.: US 6,416,856 B1
(45) Date of Patent: *Jul. 9, 2002

(54) RETROREFLECTIVE ARTICLE CONTAINING A POLYETHER POLYURETHANE BINDER LAYER

(75) Inventor: Michael D. Crandall, North Oaks, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,062

(22) Filed: Feb. 10, 1997

Related U.S. Application Data

(63) Continuation of application No. 08/344,235, filed on Nov. 23, 1994, now abandoned.

(51) Int. Cl.[7] .................................................. G02B 5/12
(52) U.S. Cl. ................... 428/325; 427/384; 428/143; 428/332; 428/337; 428/338; 428/425.5; 428/425.6; 428/913; 442/294
(58) Field of Search .................. 428/143, 240, 428/283, 323, 327, 423.1, 913, 332, 325, 337, 338, 425.5, 425.6; 427/384; 442/294

(56) References Cited

U.S. PATENT DOCUMENTS

| | | | |
|---|---|---|---|
| 3,764,455 A | 10/1973 | Lovell et al. | 161/162 |
| 3,829,505 A | 8/1974 | Herold | 260/611 B |
| 3,846,378 A | * 11/1974 | Griswold | 260/77.5 |
| 3,941,849 A | 3/1976 | Herold | 260/607 A |
| 4,242,490 A | 12/1980 | Emerson et al. | 528/77 |
| 4,355,188 A | 10/1982 | Herold et al. | 568/620 |
| 4,576,850 A | 3/1986 | Martens | 428/156 |
| 4,687,851 A | 8/1987 | Laughner | 544/398 |
| 4,721,649 A | 1/1988 | Belisle et al. | 428/325 |
| 4,725,494 A | * 2/1988 | Belisle et al. | 428/325 |
| 4,763,985 A | 8/1988 | Bingham | 350/105 |
| 4,985,491 A | 1/1991 | Reisch | 524/875 |
| 4,988,541 A | * 1/1991 | Hedblom | 427/163 |
| 5,096,993 A | 3/1992 | Smith et al. | 528/61 |
| 5,100,997 A | 3/1992 | Reisch et al. | 528/60 |
| 5,106,874 A | 4/1992 | Porter et al. | 528/64 |
| 5,116,931 A | 5/1992 | Reisch et al. | 528/59 |
| 5,117,304 A | 5/1992 | Huang et al. | 359/529 |
| 5,136,010 A | 8/1992 | Reisch et al. | 528/75 |
| 5,185,420 A | 2/1993 | Smith et al. | 528/61 |
| 5,200,262 A | 4/1993 | Li | 428/266 |
| 5,266,681 A | 11/1993 | Reisch et al. | 528/414 |
| 5,283,101 A | 2/1994 | Li | 428/141 |
| 5,338,595 A | * 8/1994 | Li | 428/143 |

OTHER PUBLICATIONS

*Aldrich*, Aldrich Chemical Co., Inc. © 1994 p. 1298.*

\* cited by examiner

*Primary Examiner*—D. S. Nakarani
(74) *Attorney, Agent, or Firm*—Karl G. Hanson

(57) ABSTRACT

A retroreflective article 10 includes retroreflective elements 12 partially embedded in a binder layer 14 that comprises a polyurethane polymer. The polyurethane polymer is a reaction product of (i) a polyether polyol having a number average molecular weight of at least 2,000 and (ii) a polyisocyanate. A retroreflective article that employs a binder layer of this kind demonstrates extraordinary laundering durability under harsh wash conditions.

40 Claims, 3 Drawing Sheets

RETROREFLECTIVE ARTICLE CONTAINING A POLYETHER POLYURETHANE BINDER LAYER

This is a continuation of application Ser. No. 08/344,235 filed Nov. 23, 1994 now abandoned.

TECHNICAL FIELD

The present invention pertains to: (i) a retroreflective article containing a polyether polyurethane binder layer; (ii) a method of making such an article; and (iii) an article of clothing that displays a retroreflective article.

BACKGROUND OF THE INVENTION

Retroreflective articles return incident light back towards the light source. This unique ability has promoted widespread use of retroreflective articles on clothing. Persons who work or exercise near motor vehicle traffic need to be conspicuously visible so that they do not get struck by passing motor vehicles. A retroreflective article highlights the person's presence to motorists at nighttime by retroreflecting light from motor vehicle headlamps. Light from the headlamps strikes the retroreflective article on the wearer's clothing and is returned toward the motor vehicle, enabling the driver to become aware of the person's presence. The bright image displayed by the retroreflective article, gives the motorists more time to react.

Retroreflective articles that are displayed on clothing typically comprise a layer of transparent microspheres, a polymeric binder layer, and a specularly reflective layer. The transparent microspheres are partially embedded in the polymeric binder layer, and the specularly reflective layer is disposed behind the microsphere's embedded portions. Light striking a retroreflective article's front surface, passes through the transparent microspheres, strikes the specularly reflective layer where it is reflected, and then returns through the microspheres where its direction is altered to travel back in the direction of the light source.

Retroreflective articles that are displayed on clothing must be able to withstand stringent laundering conditions; otherwise, the articles cannot continue to retroreflect light after repeated washings. Investigators in the retroreflective art, therefore, pursue an ongoing goal of developing launderably-durable retroreflective articles so that persons wearing retroreflective clothing can continue to be conspicuously visible after their clothing has been worn and cleaned many times. The United States patents mentioned below illustrate some of the developments in this field.

U.S. Pat. No. 4,763,985 to Bingham discloses a launderable retroreflective article comprising a layer of transparent microspheres, a specular reflective layer optically connected. to each microsphere, and a binder layer into which the microspheres are partially embedded. Resins disclosed as being suitable for use as binder layers include aliphatic and aromatic polyurethanes, polyesters, polyvinyl acetate, polyvinyl chloride, acrylics, or combinations thereof. The specular reflective layers are composed of two succeeding layers of dielectric material.

U.S. Pat. No. 5,200,262 to Li discloses a launderably durable retroreflective article comprising a monolayer of metal-coated microspheres partially embedded in and partially protruding from a binder layer that comprises a flexible polymer having active hydrogen functionality's and one or more isocyanate-functional silane coupling agents. The flexible polymers that possess active hydrogen functionality's include crosslinked, flexible, urethane-based polymers such as isocyanate-cured polymers or one or two component polyurethanes and polyols. This retroreflective article provides very good laundering durability: it can withstand industrial laundering conditions, which involve wash temperatures as high as 40 to 90° C. (105 to 190° F.) and pH values of 10 to 12.5.

U.S. Pat. No. 5,283,101 to Li discloses a launderably durable retroreflective article that comprises a binder layer formed from an electron-beam curable polymer and typically one or more crosslinkers and silane coupling agents. The electron-beam curable polymers include chlorosulfonated polyethylenes, ethylene copolymers comprising at least about 70 weight percent of polyethylene such as ethylene/vinyl acetate, ethylene/acrylate and ethylene/acrylic acid, and poly(ethylene-co-propylene-co-diene) polymers. Glass microspheres are embedded in the cured binder layer, and a specular reflective metal layer is disposed on the microsphere's embedded portions. This retroreflective article also has been shown to be durable under industrial laundering conditions.

SUMMARY OF THE INVENTION

The present invention provides a new retroreflective article that is extraordinarily durable under industrial wash conditions. In brief summary, the new article includes a layer of retroreflective elements at least partially embedded in a binder layer that comprises a polyurethane polymer that is the reaction product of (i) a polyether polyol having a number average molecular weight of at least 2,000 and (i) a polyisocyanate.

In another aspect, the present invention provides an article of clothing that has the inventive retroreflective article disposed on its outer surface. In a further aspect, the invention provides a method of making a retroreflective article, which comprises: partially embedding retroreflective elements in a binder layer that comprises a polyurethane polymer that is the reaction product of (i) a polyether polyol having a number average molecular weight of at least 2,000 and (ii) a polyisocyanate.

The present invention differs from known retroreflective articles in that the binder layer comprises a polyurethane polymer that is derived from a polyether polyol and a polyisocyanate, where the former has a number average molecular weight of at least 2,000. The inventor discovered that this binder layer provides the retroreflective article with enhanced abrasion resistance and excellent laundering durability. The retroreflective articles are able to retain a large percentage of their initial retroreflectivity after repeated washings under industrial conditions. The improved wash performance predictably stems from the resiliency of the binder layer polymer. The resiliency—it is believed—helps firmly retain the retroreflective elements in the binder layer. This prevents harsh agents from contacting the embedded retroreflective elements and causing their oxidation. Oxidized retroreflective elements are unable to retroreflect light to a significant extent. It is also suspected that the binder layer's resiliency prevents the retroreflective elements from becoming dislodged from the binder layer.

BRIEF DESCRIPTION OF THE DRAWINGS

In the drawings:

FIGS. 1–3 are idealized and are not drawn to scale.

DETAILED DESCRIPTION OF PREFERRED EMBODIMENTS

Figure 1:
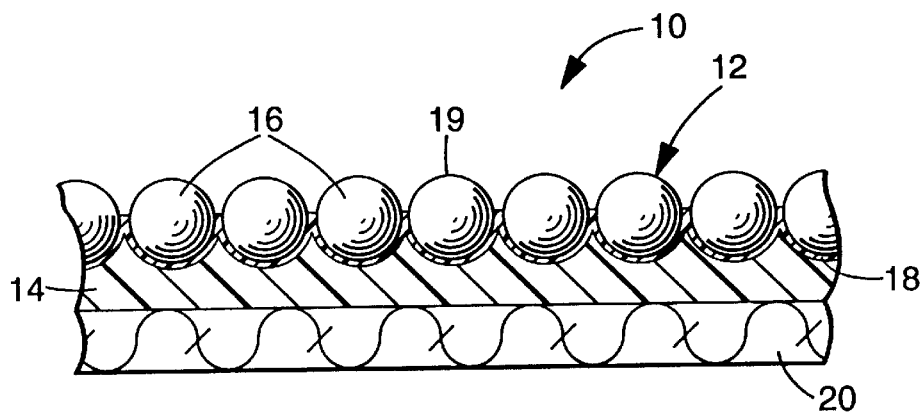
FIG. 1 is a cross-sectional view of a retroreflective article 10 in accordance with the present invention.

FIG. 1 illustrates a retroreflective article 10 that includes retroreflective elements 12 partially embedded in a binder layer 14. The retroreflective elements 12 include optical elements in the form of microspheres 16, and a specularly reflective layer 18. The microspheres 16 and the specularly reflective layer 18 return a substantial quantity of incident light towards the light source. Light, which strikes the front surface 19 of the retroreflective article, passes through microspheres 16, is reflected by layer 18 to again reenter the microspheres, where the light's direction is altered to return towards the light source. A fabric 20 is shown bonded to the opposite side of the binder layer 14 to improve the article's structural integrity. Retroreflective article 10 may be applied to a substrate (not shown) that forms part of an article of clothing.

The binder layer contains a polyurethane polymer that is a reaction product of (i) a polyether polyol having a number average molecular weight of at least 2,000 and (ii) a polyisocyanate. The polyurethane polymer contains the urethane group, —NH.CO.O—, but the polymer also may contain other groups such as urea groups. Urea groups may be present in the polymer when a diamine chain extender is used in the reaction mixture as discussed below. The polyurethane polymer preferably is formed by reacting a mixture of polyether polyols, chain extender, and a polyisocyanate in a one-shot process. In a one-shot process, the polymerization is carried out in a single reaction, as opposed to a reaction that involves a number of sequential steps where a prepolymer is first formed that is subsequently reacted with the chain extender. A catalyst also may be added to the reaction mixture to facilitate polymer formation.

The polyether polyols may have a functionality up to about 8 but preferably have a functionality from about 2 to 4. The polyetherpolyols preferably are diols, triols, or combinations of both. The polyether polyol preferably is prepared in the presence of a double-metal cyanide (DMC) complex catalyst, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420, and 5,266,681, incorporated here by reference. Polyether polyols produced in the presence of such catalysts tend to have high molecular weights and low levels of unsaturation, properties of which, it is believed, are responsible for the improved performance of inventive retroreflective articles. The polyether polyols preferably have a number average molecular weight of 2,000 to 12,000, more preferably 4,000 to 9,000, and even more preferably 5,000 to 8,000. The polyether polyols preferably have an end group unsaturation level of no greater than 0.04 milliequivalents per gram of polyol. More preferably, the polyether polyol has an end group unsaturation of no greater than 0.02 milliequivalents per gram of polyol. A polyether diol typically is of the formula HO—(R(R$^1$)O)$_x$H where R is an alkyl group having 1 to 6 carbon atoms such as ethyl, propyl, butyl, and isopropyl. R$^1$ independently represents hydrogen or R, and x is an integer of about 1 to 350. Preferred diols include polyisopropylene oxide, polytetramethylene oxide, polyisobutyl oxide, and combinations thereof. Examples of commercially available diols that may be suitable include ARCOL R-1819 (molecular weight (MW) 8,000), E-2204 (MW 4,000), and ARCOL E-2211 (MW 11,000). These diols are available from ARCO Chemical Company of Newtown Square, Pa. A polyether triol may be represented by the formula HO—[—(R(R$^1$)O)$_x$R$^2$O—)$_y$—]H, where R, R$^1$, and x are as described above, R$^2$ represents an alkyl group that contains 1 to 6 carbon atoms and that has a pendant hydroxyl group, and y is 1. A preferred polyether triol is polyisopropylene oxide such as ARCOL E-2306 (MW 6,000).

The reaction mixture preferably contains 60 to 100 parts of diol per total parts of polyol. More preferably, the reaction mixture contains 70 to 99 parts of diol, and even more preferably 85 to 95 parts diol per total parts polyether polyol. The triol preferably is present in the polyol mixture at 0 to 40 parts, more preferably 1 to 30 parts, and even more preferably 5 to 15 parts, based on the total polyether polyol parts in the reaction mixture. The diol preferably predominates the quantity of polyols, but some triol desirably is present so that some crosslinking occurs, allowing the polymer to undertake a thermoset condition. In a preferred form, the polyurethane preferably also is elastomeric, which means the polymer can be stretched to twice its original length and returned to approximately its original length when released. The amount of polyether polyol in the reaction mixture may vary based on the type of polyisocyanate.

The polyisocyanate may be an aromatic polyisocyanate, an aliphatic polyisocyanate, or a combination of both. Examples of aromatic polyisocyanates include toluene diisocyanate (TDI), methylene-bis(4-phenyl) isocyanate (also referred to as diphenyl methane diisocyanate or MDI), and xylene diisocyanate, polyphenylene polymethylene isocyanate (PMDI). Examples of aliphatic polyisocyanates include methylene-bis(cyclohexyl isocyanate), commonly referred to as H$_{12}$MDI, hexamethylene diisocyanate, and isophorone diisocyanate. Mixtures and derivatives of the above polyisocyanates also may be employed.

Useful chain extenders include diols and diamines such as 1,4 butane diol, 1,6 cyclohexane dimethanol, 1,6 hexane diol, 2-methyl-1,3 propane diol, bisphenol A, polyalkyleneoxide polyols having molecular weights of 100 to 500, and 4,4'-methylene bis(2-chloroaniline). Chain extenders also may include triols such as glycerin, trimethylolpropane, et cetera. A preferred chain extender is 1,6 cyclohexane dimethanol.

The reaction mixture preferably has an isocyanate to hydroxyl ratio of 0.9 to 1.2, more preferably 1 to 1.1. The ratio of isocyanate groups to hydroxyl groups includes only the isocyanate groups on the polyisocyanate, but the hydroxyl groups of both the polyether polyol and chain extender are used to calculate the number of hydroxyl groups. The weight percent of chain extender to polyether polyol preferably is about 0.5 to 5, more preferably about 0.7 to 1.5, and even more preferably 1 to 1.2.

A catalyst generally is employed in the reaction mixture. Catalysts for the reaction of polyisocyanates and active hydrogen-containing compounds are well-known in the art; see, for example, U.S. Pat. No. 4,495,061. Preferred catalysts include organometallic compounds and amines. The organometallic compounds may be organotin compounds such as dimethyltin dilaurate, dibutyltin dilaurate, dibutyltin dimercaptide, dimethyltin dithioglycolate, and dioctyltin dithioglycolate. The amine catalysts preferably are tertiary amines such as triethylene diamine, $\beta,\beta$-dimorpholinodiethyl ether, and tris(dimethylamino ethyl) phenol. Generally, the catalyst is employed in the reaction mixture at 0.05 to 0.30 weight percent, preferably 0.06 to 0.20 weight percent, and more preferably 0.07 to 0.15 weight percent.

In addition to the above components, the reaction mixture may contain other additives such as adhesion promoters. Examples of adhesion promoters include silanes that are isocyanate-functional, amine-functional, mercapto-functional and glycidyl-functional. Other adhesion promoters include organo-functional chromium compounds, organo-functional titaniums, and chelating agents such as disclosed in U.S. patent application Ser. No. 08/216,404 entitled *Retroreflective Article And Method Of Making The Same* filed on Mar. 23, 1994.

Additionally, the binder layer may contain colorants (for example, pigments, dyes, metal flakes), fillers, stabilizers (for example, thermal stabilizers and antioxidants such as hindered phenols and light stabilizers such as hindered amines or ultraviolet stabilizers), flame retardants, flow modifiers (for example, surfactants such as fluorocarbons or silicones), plasticizers, and elastomers. Care should be taken when selecting such additives because some may detrimentally affect laundering durability. For example, high levels of flame retardants such as melamine pyrophosphate may have a deleterious effect on the article's retroreflective performance after laundering. Preferred colorants for articles having aluminum retroreflective layers include black dyes such as metal-azo dyes.

The binder layer typically is a continuous, fluid-impermeable, polymeric, sheet-like layer which has a thickness of about 1 to 250 microns. Preferably, the thickness is about 50 to 150 microns. Thicknesses less than 50 microns may be too thin to adhere to both the substrate and the optical elements, and thicknesses greater than 150 microns may unnecessarily stiffen the applique and add to its cost.

As indicated above, optical elements are supported by the binder layer to alter the direction of light. The optical elements can be microspheres that, preferably, are substantially spherical in shape in order to provide the most uniform and efficient retroreflection. The microspheres preferably also are substantially transparent so as to minimize absorption of light so that a large percentage of incident light is retroreflected. The term "transparent" is used herein to mean capable of transmitting light. The microspheres often are substantially colorless but may be tinted or colored in some other fashion. The microspheres may be made from glass, a non-vitreous ceramic composition, or a synthetic resin. In general, glass microspheres are preferred because they tend to be less expensive, harder, and more durable than microspheres made from synthetic resins. Examples of microspheres that may be useful in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

The microspheres typically have an average diameter in the range of about 30 to 200 microns. Microspheres smaller than this range tend to provide lower levels of retroreflection, and microspheres larger than this range may impart an undesirably rough texture to the retroreflective article or may undesirably reduce its flexibility. Microspheres used in the present invention typically have a refractive index of about 1.7 to about 2.0, the range typically considered to be useful in microsphere-based retroreflective products where the front surfaces of the microspheres are exposed to the ambient environment, namely, air. Retroreflective articles that have the microspheres exposed to the ambient environment commonly are referred to as "exposed lens retroreflective sheetings."

As mentioned above, optical elements used in this invention can have a metal reflective layer disposed beneath the embedded portions of the optical elements to provide a multitude of retroreflective elements. Preferably, the metal reflective layer is disposed on the embedded or rear portions of the optical elements. The term "metal reflective layer" is used herein to mean a layer comprising elemental metal which is capable of reflecting light, preferably specularly reflecting light. The metal may be a continuous coating produced by vacuum-deposition, vapor coating, chemical-deposition, or electroless plating. A variety of metals may be used to provide a specularly reflective metal layer. These include aluminum, silver, chromium, nickel, magnesium, and the like, in elemental form. Aluminum and silver are preferred metals for use in the reflective layer. It is to be understood that in the case of aluminum, some of the metal may be in the form of the metal oxide and/or hydroxide. Aluminum and silver metals are preferred because they tend to provide good retroreflective brightness. The metal layer should be thick enough to reflect incoming light. Typically, the metal reflective layer is about 50 to 150 nanometers thick. Although the reflective color of a silver coating can be brighter than an aluminum coating, an aluminum layer normally is more preferred because it can provide better laundering durability when adhered to a glass optical element.

In lieu of or in addition to a metal reflective layer, a dielectric mirror may be used as a specularly reflective layer. The dielectric mirror may be similar to known dielectric mirrors disclosed in U.S. Pat. Nos. 3,700,305 and 4,763,985 to Bingham. The disclosures of these patents are incorporated here by reference. In using dielectric mirrors, the microspheres typically have a refractive index $n_2$ and have a layer of transparent material disposed thereon which has a refractive index $n_1$. The opposite face of the transparent material having refractive index $n_1$, is in contact with a material having a refractive index $n_3$. Both $n_2$ and $n_3$ have a refractive index of at least 0.1, preferably at least 0.3, higher or lower than $n_1$. The transparent material is a layer typically having an optical thickness corresponding to odd numbered multiples (that is, 1, 3, 5, 7 . . . ) of about one-quarter wavelength of light in the wavelength range of about 380 to about 1,000 nanometers. Thus, either $n_2>n_1<n_3$ or $n_2<n_1>n_3$, and the materials on either side of the transparent layer may be either both higher or both lower in refractive index than $n_1$. When $n_1$ is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and n3 are preferably in the 1.7 to 4.9 range. The dielectric mirror preferably comprises a contiguous array of materials, at least one being in layer form, having an alternating sequence of refractive indices. In a preferred embodiment, the contiguous array has from two to seven layers, preferably three to five layers, adjacent to the spherical lens element. Desirably all are light transparent materials and are clear or essentially colorless to minimize light absorption and maximize display of the colored binder layer.

A dielectric mirror can provide very good retroreflectivity; although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si $Ta_2O_5$, Te, $TiO_2$; low index materials such as $Al_2O_3$, $AlF_3$, $CaF_2$, $CeF_3$, LiF, $MgF_2$, NaCle, $Na_3AlF_6$, $ThOf_2$, elastomeric copolymers of perfluoropropylene and vinylidene fluoride (refractive index of >>1.38), et cetera. Other materials are reported in *Thin Film Phenomena,* K. L. Chopra, page 750, McGraw-Hill Book Company, New York, (1969). Preferred succeeding layers contain cryolite ($Na_3AlF_6$) and zinc sulfide.

Figure 2:
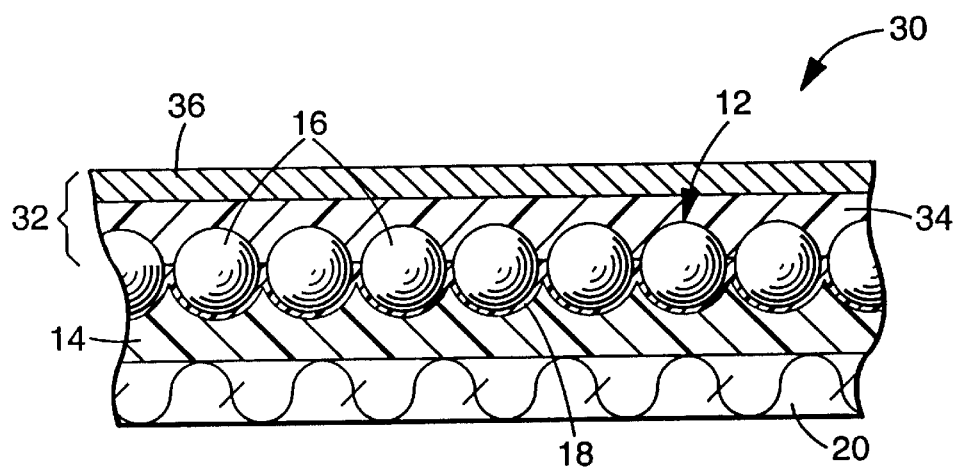
FIG. 2 illustrates an article 30 used to form a retroreflective article 10 in accordance with the present invention.

A retroreflective article 10 can be made by first forming article 30 shown in FIG. 2. In forming article 30, a multitude of retroreflective elements 12 are partially embedded in the carrier web 32. This can be accomplished by cascading transparent microspheres 16 onto a carrier web 32 in a desired temporary arrangement. Microspheres 16 preferably are packed as closely as possible on the carrier 32, and may be so arranged by any convenient process, such as printing, screening, cascading, or with a hot can roll. Carrier web 32 can include a heat softenable polymer layer 34 on a paper sheet 36. Examples of useful polymer layers 34 for carrier web 32 include: polyvinyl chloride; polyolefins such as polyethylene, polypropylene, and polybutylene; and polyesters; et cetera. For a further discussion of applying microspheres to the carrier web, see U.S. Pat. Nos. 4,763,985; 5,128,804; and 5,200,262, the disclosures of which are incorporated here by reference.

Polymer layer 34 retains microspheres 16 in the desired arrangement. Depending in part on the characteristics of the carrier web 32 and microspheres 16, it may be desirable to condition carrier 32 and/or microspheres 16 by applying selected release agents or adhesion promoters to achieve desired carrier release properties.

A reflective layer 18 then is applied to carrier web 32 on the side where the microspheres protrude from. The size of the retroreflective elements 12 as indicated by the portion of the microspheres covered with the reflective layer 18, may be controlled in part by controlling the depth to which the microspheres 16 are embedded in the carrier. After retroreflective elements 12 are created, the binder layer 14 can be formed on the specularly reflective layer to produce article 30.

The binder layer 14 can be formed over the reflective layer 18 by mixing the reactants together and quickly coating them over the reflective layer 18. The coating typically is heated to about 25 to 150° C. to increase the rate of reaction. Preferably, the coated mixture is heated to 35 to 120° C., and more preferably 40 to 110° C. The heating step enables a polyurethane binder layer to be formed that has superior resiliency, allowing the article to demonstrate extraordinary laundering durability. Additional layers of polyurethane polymer can be formed over the reflective layer as so desired to form the binder layer. Further, a fabric 20 can be adhered to the binder layer by placing it on the coated mixture before the polymer is fully reacted. After the binder layer has been formed, the carrier 32 can be separated from article 30 to produce a retroreflective article 10 of the invention.

The inventive retroreflective articles may be applied to substrates using mechanical methods such as sewing. In some applications, however, it is desired to secure the article to the substrate by an adhesive layer (not shown) with or without fabric layer 20. The adhesive layer may be a pressure-sensitive adhesive, a heat-activated adhesive, or an ultraviolet-radiation-activated adhesive. The substrate bearing the retroreflective article can be located on the outer surface of an article of clothing, enabling the retroreflective article to be displayed when the clothing is worn in its normal orientation on the person. The substrate may be, for example: a woven or nonwoven fabric such as a cotton fabric; a polymeric layer including nylons, olefins, polyesters, cellulosics, urethanes, vinyls, acrylics, rubbers; leather; and the like.

Figure 3:
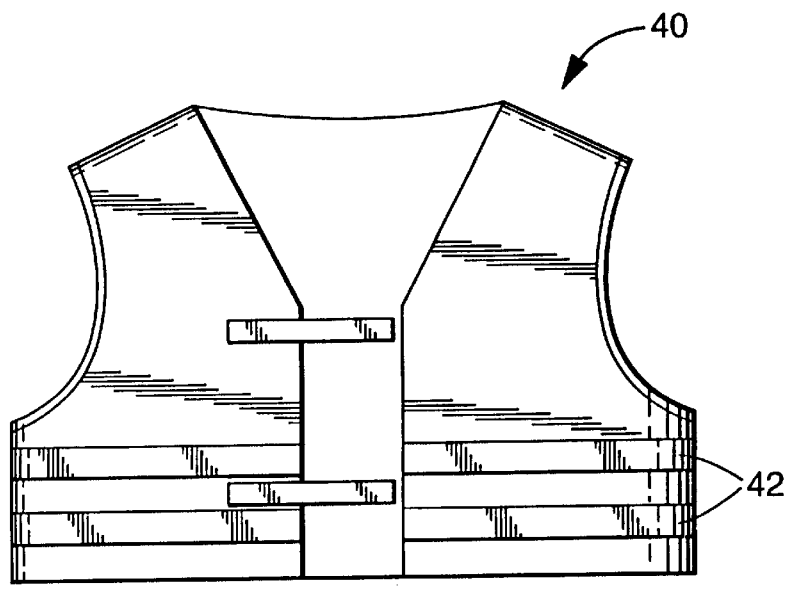
FIG. 3 illustrates an article of clothing 40 displaying a retroreflective article 10 in accordance with the present invention.

FIG. 3 illustrates a safety vest 40, displaying a retroreflective article 42 in the form of an elongated sheeting or strip. Safety vests often are worn by road construction workers to improve their visibility to oncoming motorists. These kinds of vests frequently come into contact with dirt and grime, and therefore the retroreflective article must be able to withstand harsh cleaning conditions so that the vest can be reused a number of times. The retroreflective sheeting of this invention allows this kind of cleaning to be accomplished. Although a safety vest 40 has been chosen for illustration, the article of clothing of the invention may come in a variety of forms. As the term is used herein, "article of clothing" means a launderable item of wearing apparel sized and configured to be worn or carried by a person. Other examples of articles of clothing that may display retroreflective articles of the invention include shirts, sweaters, jackets, coats, pants, shoes, socks, gloves, belts, hats, suits, one-piece body garments, bags, backpacks, et cetera.

Advantages and other properties and details of this invention are further illustrated in the following Examples. It is to be expressly understood, however, that while the examples serve this purpose, the particular ingredients and amounts used and other conditions are not to be construed in a manner that would unduly limit the scope of this invention. The Examples selected for disclosure herein are merely illustrative of how to make preferred embodiments of the invention and how the preferred embodiments generally perform. Other examples, not disclosed below, may have performed somewhat better or somewhat worse.

EXAMPLES

The following test methods were used in the Examples.

Industrial Wash Procedure

Launderability was evaluated by washing and drying a piece of fabric to which the retroreflective article was applied. The combined sequence of washing and drying is referred to as a cycle. The samples were washed using a Milnor System 7 Washing Machine Model 30015M4G from Pellerin Milnor Corp. in accordance with program no. 7 for heavily soiled, colored fabrics. The fabric was a 100 percent cotton towel, and the retroreflective article was secured to the fabric by sewing. The washer was loaded with enough pieces (approximately 80) of fabric (about 45 centimeters (cm) by 75 cm) to make a 28 pound load including from one to four pieces of fabric having several (typically about 5) retroreflective articles of the invention about 5 by 15 centimeters in size secured thereto. The cleaning agents used were 30 grams of FACTOR™ detergent (from Diversey Fabrilife Chemicals, Inc., Cincinnati, Ohio) containing by weight, approximately, 40 percent tetrasodium pyrophosphate, 30 percent nonylphenoxypoly(ethyleneoxy) ethanol, 20 percent sodium carbonate and 10 percent amorphous silica, and 60 grams of ORTHOSILT™ (a pH builder from Elf Atochem North America, Philadelphia, Pa., containing approximately 40 weight percent NaOH and 60 weight percent sodium metasilicates). In Program No. 7 the following steps are carried out to complete the washing portion of a cycle.

| Operation | Time (minutes) |
|---|---|
| Suds | 10 |
| Flush | 2 |
| Flush | 7 |
| Flush | 7 |
| Flush | 2 |
| Hot Rinse | 2 |
| Split Rinse | 2 |
| Cold Rinse | 4 |
| Extract | 6 |
| Total | 41 (51:20*) |

*Total time in minutes, which includes approximate fill times

In the suds step, hot water (68 liters at 74° C.) and the cleaning agents are introduced into the machine washing basket under agitation. In the flush steps, fresh hot water (68 liters at 74° C.) is added to the washing basket after the same amount of the old water containing the cleaning agents is purged.

The rinse steps essentially are the same as the flush steps except the water becomes cooler. In the first rinse, the water is approximately 74° C., in the second rinse (split rinse), the water is approximately 46° C., and in the final cold rinse, the water is approximately 18° C. The washing basket is agitated during the flush and rinse steps. In the extract step, the machine undergoes a high-speed spin cycle to remove water from the washed samples. After washing but before being tested for retroreflectivity, the samples were dried in a Maytag™ home dryer on regular setting for 30 minutes to complete an Industrial Wash Procedure Cycle. After the designated number of cycles, the retroreflective brightness of the middle of each sample was determined.

Retroreflective Brightness Test

The coefficient of retroreflection, $R_A$, was measured in accordance with standardized test ASTM E 810-93b. The test results are expressed below as the percentage of initial retroreflective brightness, where $R_A$ is expressed in candelas per lux per square meter ($cd \cdot lx^{-1} \cdot m^{-2}$). The entrance angle used in ASTM E 810-93b was −4 degrees, and the observation angle was 0.2 degrees. Further reference to "ASTM E 810-93b" means ASTM E 810-93b where the entrance and observation angles are as specified in the previous sentence.

Example 1

Glass microspheres having an average diameter of about 40 to 90 micrometers were partially imbedded in a temporary carrier sheet. The carrier contained juxtaposed paper and polyethylene layers, and the microspheres were embedded in the polyethylene layer. A specularly-reflective aluminum layer was vapor deposited over the protruding portions of the glass microspheres to form a monolayer of retroreflective elements. This sheet material was used as the base for applying the bead bond formulation that contained:

27.0 g. ARCOL—R1819 polyether polyol (8000 molecular weight diol)
3.0 g. ARCOL—E-2306 polyether polyol (6000 molecular weight triol)
0.30 g. Cyclohexane dimethanol (chain extender)
1.20 g. OSi—Silane A-1310 (adhesion promotor)
4.38 g. Miles—Desmodur CB-75 (polyisocyanate), and
0.05 g. Dibutyltin dilaurate (catalyst).

The reaction for forming the polyurethane was carried out by weighing the reactants into a vessel in the order printed above. The reactants were mixed by hand at room temperature and were quickly coated at a 0.1 millimeters (mm) (4 mils) thickness on the aluminum layer. The coating was allowed to stand at room temperature for two minutes, followed by two minutes in an oven at 65° C. (150° F.), and five minutes at 110° C. (230° F.). An additional 0.1 mm (4 mil) coating of the same mixture was coated over the first layer of polyurethane reactants. After two minutes at room temperature and two minutes in an oven at 110° C. (230° F.), a 100 percent polyester fabric was adhered to the binder layer on the side opposite the aluminum layer. The retroreflective article was put in an oven, which was heated to 110° C. (230° F.), for ten minutes. The heating of the reactants allowed an elastomeric, thermoset polyether polyurethae to be formed as a binder layer between the vapor coated beads and the fabric.

Examples 2–12

Examples 2–12 were prepared as described above, except the reactants were used in the amounts set forth in Table 1.

TABLE 1

| Ex. No. | 8000 MW Diol (parts) | 6000 MW Triol (parts) | Chain Extender | Chain Extender (wt %)* | Polyisocyanate | NCO/OH Ratio | Adhesion Promoter[e] (wt. %)* |
|---|---|---|---|---|---|---|---|
| 1 | 90 | 10 | CHDM[a] | 1.0 | CB-75[c] | 1.05 | 4 |
| 2 | 90 | 10 | CHDM | 0.75 | CB-75 | 1.05 | 4 |
| 3 | 90 | 10 | CHDM | 1.25 | CB-75 | 1.05 | 4 |
| 4 | 100 | — | BDO[b] | 4.0 | CB-75 | 1.05 | 4 |
| 5 | 100 | — | BDO | 1.0 | CB-75 | 1.50 | 4 |
| 6 | 80 | 20 | BDO | 1.0 | CB-75 | 1.05 | 4 |
| 7 | 70 | 30 | BDO | 1.0 | CB-75 | 1.05 | 4 |
| 8 | 90 | 10 | BDO | 1.0 | N-3300[d] | 1.05 | 4 |
| 9 | 93 | 7 | BDO | 1.0 | N-3300 | 1.05 | 4 |
| 10 | 96 | 4 | BDO | 1.0 | N-3300 | 1.05 | 4 |

TABLE 1-continued

| Ex. No. | 8000 MW Diol (parts) | 6000 MW Triol (parts) | Chain Extender | Chain Extender (wt %)* | Polyiso-cyanate | NCO/OH Ratio | Adhesion Promoter[e] (wt. %)* |
|---|---|---|---|---|---|---|---|
| 11 | 90 | 10 | BDO | 1.0 | CB-75 | 1.15 | 6 |
| 12 | 90 | 10 | BDO | 1.0 | CB-75 | 1.25 | 6 |

[a]CHDM - cyclohexane dimethanol
[b]BDO - 1,4-butane diol
[c]CB-75 - a toluene diisocyanate based polyisocyanate from Miles, Inc., Pittsburgh, Pennsylvania
[d]N-3300 - a hexamethylene diisocyanate trimer from Miles, Inc.
[e]A-1310 - an isocyanato functional silane from OSi Specialties Inc., Tarrytown, New York
*Weight percent based on total weight of polyether polyols The samples were washed according to the Industrial Wash Procedure and were tested to determine the coefficient of retroreflective brightness, $R_A$, according to ASTM E 810-93b. The percent retroreflective brightness retained was determined as a percent of initial retroreflective brightness. Results are set forth below in Table 2.

TABLE 2

| Example No. | Initial $R_A$ | $R_A$ after 25 Wash Cycles | $R_A$ Retained (%) |
|---|---|---|---|
| 1 | 609 | 280 | 46.0 |
| 2 | 599 | 250 | 41.7 |
| 3 | 597 | 299 | 50.1 |
| 4 | 577 | 154 | 26.7 |
| 5 | 585 | 131 | 22.4 |
| 6 | 628 | 88* | 14.0* |
| 7 | 603 | 89* | 14.8* |
| 8 | 630 | 84 | 13.3 |
| 9 | 600 | 154 | 25.7 |
| 10 | 629 | 108 | 17.2 |
| 11 | 617 | 347 | 56.2 |
| 12 | 621 | 327 | 52.7 |

*Indicates measured result after 15 wash cycles.

Figure 4:
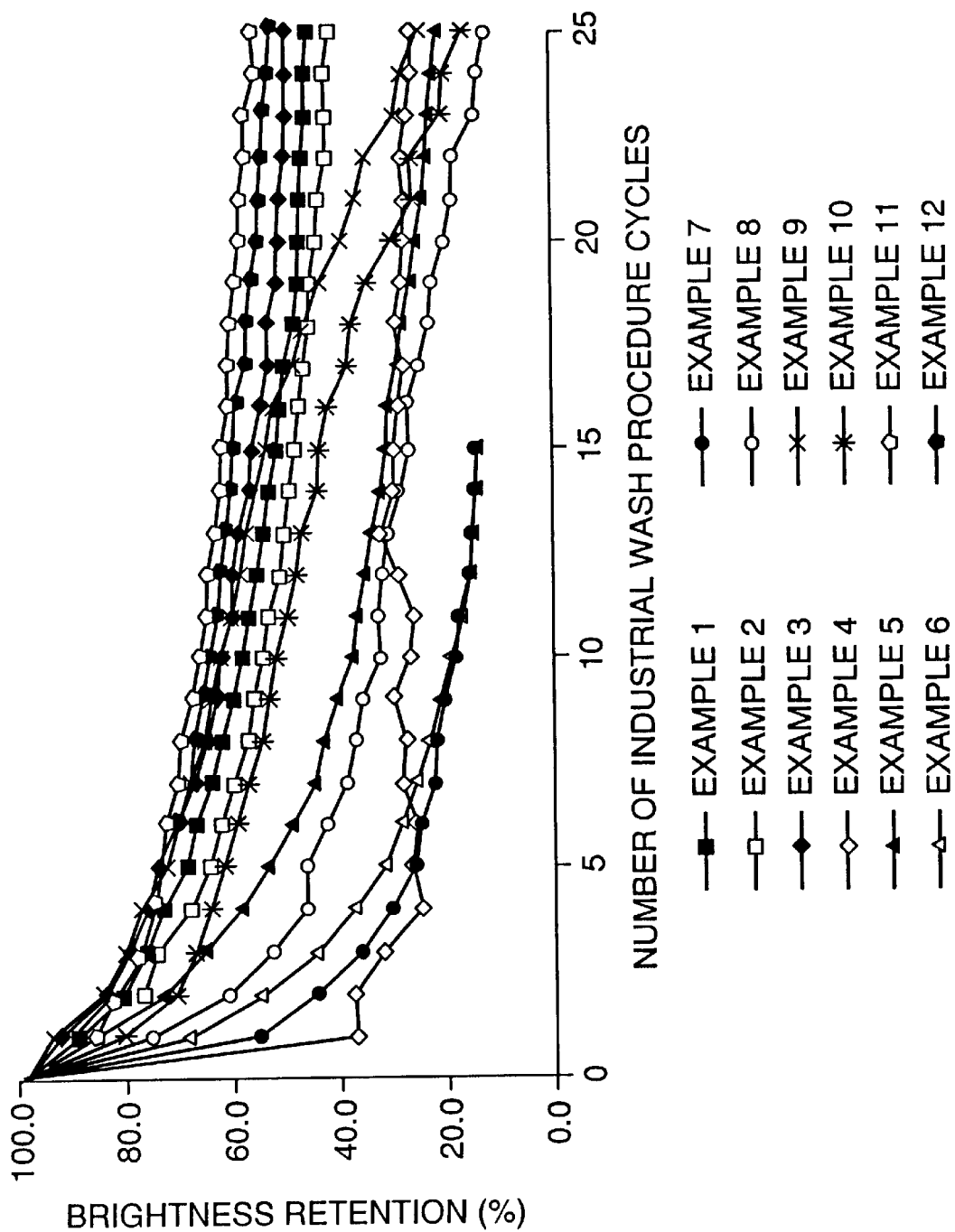
FIG. 4 is a graph showing the industrial wash performance of retroreflective articles of the invention.

The data in Table 2 demonstrates that samples of the invention exhibit excellent industrial wash durability. Samples of the invention also exhibit a decay profile that is very unique. When a graphical plot of the data is constructed as shown in FIG. 4, one can easily see a decay profile with two distinct regions: the initial sharp exponential decay in brightness followed by a slow linear decline at a higher number of washes. This is atypical of a normal degradation response, which is essentially exponential throughout. The two regions in the decay profile suggest that two mechanisms are responsible for decay in brightness. It is possible that the initial region is where loose reflective elements are lost, whereas the second region is representative of the excellent durability provided by these new bead bond polymers.

Figure 5:
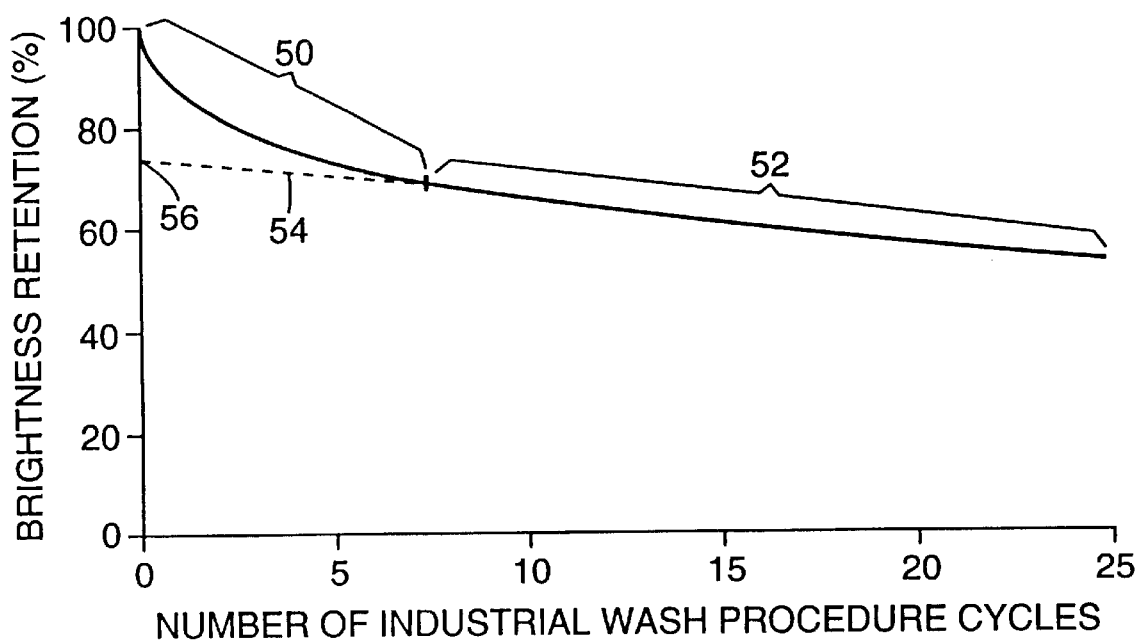
FIG. 5 is a graph illustrating a typical Retroreflective Brightness Decay Profile for a retroreflective article of the invention.

With reference to FIG. 5, a Retroreflective Brightness Decay Profile is illustrated that is representative of the durability generally exhibited by retroreflective articles of the invention. A Retroreflective Brightness Decay Profile is a plot of Percent Retained Retroreflective Brightness (ordinate) versus number of Industrial Wash Procedure Cycles (abscissa). Region 50 represents the initial exponential decay. The exponential decay generally occurs within the first ten Industrial Wash Procedure Cycles. After 10 cycles the decay is essentially linear as noted in region 52. Decay in retroreflectivity in region 52 follows a slightly negative linear slope. When line 52 intercepts with the brightness retention axis, by extrapolating line 52 as noted by dotted line 54, its intercept generally is greater than 40 percent, more typically exceeds 50 percent, and can be greater than 60 percent of the initial retroreflective brightness. Some embodiments of the invention may be an intercept greater than 70 with a negative slope of down to only −1.2. The negative slope of line 52 typically is less than zero down to −2.5, preferably is less than zero down to −2, and more preferably is less than zero down to only −1.5. It is believed that a retroreflective article, which follows this kind of Retroreflective Brightness Decay Profile after being subjected to washings according to an Industrial Wash Procedure, is new to the art.

What is claimed is:

1. A retroreflective article comprising:
   a layer of retroreflective elements at least partially embedded in a binder layer that comprises a polyurethane polymer that is the reaction product of (i) a polyether polyol having a number average molecular weight of at least 4,000 and having an end group unsaturation level of no greater than 0.04 milliequivalents per gram of polyether polyol and (ii) a polyisocyanate.

2. The retroreflective article of claim 1, wherein the polyurethane polymer is formed by reacting a polyether polyol, chain extender, and polyisocyanate in a one-shot process.

3. The retroreflective article of claim 1, wherein the polyether polyol is selected from the group consisting of diols, triols, and combinations of both.

4. The retroreflective article of claim 3, wherein the polyether polyol is prepared in the presence of a double-metal cyanide complex catalyst.

5. The retroreflective article of claim 3, wherein the polyether polyol has a number average molecular weight of 4.000 to 12,000.

6. The retroreflective article of claim 3, wherein the polyether polyol has a number average molecular weight of 4,000 to 9,000.

7. The retroreflective article of claim 6, wherein the polyether polyol has a number average molecular weight of 5,000 to 8,000.

8. The retroreflective article of claim 3, wherein the polyether polyol has an end group unsaturation level of no greater than 0.04 milliequivalents per gram of polyol.

9. The retroreflective article of claim 8, wherein the polyether polyol has an end group unsaturation of no greater than 0.02 milliequivalents per gram of polyol.

10. The retroreflective article of claim 3, wherein the polyether diol is of the formula HO-(R(R$^1$)O-)$_x$H, where R is an alkyl group having 1 to 6 carbon atoms, R$^1$ independently represents R or hydrogen, and x is an integer of 1 to 350.

11. The retroreflective article of claim 10, wherein the diol is selected from the group consisting of polyisopropylene oxide, polytetramethylene oxide, polyisobutyl oxide, and combinations thereof.

12. The retroreflective article of claim 10, wherein the polyether triol is of the formula HO-[-(R(R$^1$)O-)$_x$-(R$^2$O-)

$_y$]H, where R² represents an alkyl group that contains 1 to 6 carbon atoms and that has a pendant hydroxyl group, and y is 1.

13. The retroreflective article of claim 12, wherein the polyether triol is polyisopropylene oxide.

14. The retroreflective article of claim 3, wherein the polyurethane polymer is formed from a reaction mixture containing 60 to 100 parts of polyether diol, and 0 to 40 parts polyether triol, based on total parts of polyether polyol.

15. The retroreflective article of claim 14, wherein the reaction mixture contains 70 to 99 parts of polyether diol and 1 to 30 parts of polyether triol.

16. The retroreflective article of claim 15, wherein the reaction mixture contains 85 to 95 parts of polyether diol and 5 to 15 parts of polyether triol.

17. The retroreflective article of claim 1, wherein the polyurethane polymer is a thermoset elastomer.

18. The retroreflective article of claim 1, wherein the polyisocyanate is an aromatic or aliphatic polyisocyanate or a combination thereof.

19. The retroreflective article of claim 2, wherein the chain extender is 1,6 cyclohexane dimethanol.

20. The retroreflective article of claim 1, wherein the isocyanate to hydroxyl ratio is 0.9 to 1.2.

21. The retroreflective article of claim 20, wherein the isocyanate to hydroxyl ratio is 1 to 1.1.

22. The retroreflective article of claim 2, wherein the weight percent chain extender to polyether polyol is 0.5 to 5.

23. The retroreflective article of claim 22, wherein the weight percent chain extender to polyether polyol is 0.7 to 1.5.

24. The retroreflective article of claim 23, wherein the weight percent chain extender to polyether polyol is 1 to 1.2.

25. The retroreflective article of claim 1, wherein the polyurethane polymer is formed in the presence of dibutyltin dilaurate as a catalyst.

26. The retroreflective article of claim 1, wherein the reaction mixture contains an adhesion promoter.

27. The retroreflective article of claim 1, wherein the binder layer has a thickness of 1 to 250 microns, and the retroreflective elements include transparent microspheres that have an average diameter 30 to 200 microns and that have an aluminum or silver reflective layer disposed behind the embedded portions of the microspheres.

28. The retroreflective article of claim 1, exhibiting a retroreflective brightness decay profile that is essentially linear after approximately ten industrial wash procedure cycles.

29. The retroreflective article of claim 28, wherein the linear part of the retroreflective brightness decay profile has a slope of less than zero down to −2.5, which linear part, when extrapolated, intersects with the brightness retention axis at 40 percent or greater.

30. The retroreflective article of claim 29, wherein the linear part of the retroreflective brightness decay profile has a slope of less than zero down to −2, which linear part, when extrapolated, intersects with the brightness retention axis at 50 percent or greater.

31. The retroreflective article of claim 30, wherein the linear part of the retroreflective brightness decay profile has a slope of less than zero down to −1.5, which linear part, when extrapolated, intersects with the brightness retention axis at 60 percent or greater.

32. A method of making a retroreflective article, which comprises: partially embedding retroreflective elements in a binder layer that comprises a polyurethane polymer that is the reaction product of (i) a polyether polyol having a number average molecular weight of at least 4,000 and having an end group unsaturation level of no greater than 0.04 millequivalents per gram polyether polyol and (ii) a polyisocyanate.

33. The method of claim 32, wherein the retroreflective elements are partially embedded in the binder layer by the steps comprising:
mixing the polyether polyol and polyisocyanate together;
coating the mixture onto a layer of retroreflective elements; and
heating the coated reactants to 25 to 150° C.

34. The method of claim 32, further comprising adhering a fabric to the binder layer by placing the fabric on the coated mixture before the heating step.

35. An article of clothing, which comprises:
(a) a retroreflective article that includes:
(i) a binder layer comprising a polyurethane polymer formed from: a polyether polyol having a number average molecular weight of at least 4,000 and having an end group unsaturation level of no greater than 0.04 millequivalents per gram polyether polyol; and a polyisocyanate; and
(ii) retroreflective elements at least partially embedded in the binder layer; and
(b) a substrate that forms part of the outer portion of the article of clothing;
the retroreflective article being secured to the substrate.

36. A retroreflective article that has a layer of microspheres partially embedded in a polyether polyurethane binder layer made from a polyether polyol that has a number average molecular weight of at least 4,000, and that has an end group having an end group unsaturation level of no greater than 0.04 millequivalents per gram polyether polyol; the retroreflective article exhibiting a retroreflective brightness decay profile that is essentially linear after ten industrial wash procedure cycles, the linear part of the decay profile has a slope of less than zero down to −2.5, which linear part, when extrapolated, intersects with the brightness retention axis at a value of 40 percent or greater.

37. The retroreflective article of claim 36, wherein the linear part of the decay profile has a slope of less than zero down to −2 that when extrapolated intersects with the brightness retention axis at 50 percent or greater.

38. The retroreflective article of claim 37, wherein the linear part of the decay profile has a slope of less than zero down to −1.5 that when extrapolated intersects with the brightness retention axis at 60 percent or greater.

39. A retroreflective article comprising: a layer of retroreflective elements at least partially embedded in a binder layer that comprises a polyurethane polymer made by reacting in a one-shot process a polyether polyol, a polyisocyanate, and a chain extender, the polyether polyol having a number average molecular weight of at least 4,000 and having an end group unsaturation level of no greater than 0.04 milliequivalents per gram of polyol, the ratio of isocyanate to hydroxyl groups being 0.9 to 1.2, and the weight percent of chain extender to polyester polyol being 0.5 to 5, the polyether polyol including 70 to 99 parts diol and 1 to 30 parts triol per total polyether polyol parts in the reaction.

40. An exposed lens retroreflective article that comprises;
a layer of retroreflective elements partially embedded in a binder layer that comprises a polyurethane polymer that is the reaction product of (i) a polyether polyol having a number average molecular weight of at least 2,000 and having an end group unsaturation level of no greater than 0.04 milliequivalents per grain of polyether polyol and (ii) a polyisocyanate.

* * * * *

UNITED STATES PATENT AND TRADEMARK OFFICE
CERTIFICATE OF CORRECTION

PATENT NO.     : 6,416,856 B1
DATED           : July 9, 2002
INVENTOR(S)  : Crandall, Michael D.

It is certified that error appears in the above-identified patent and that said Letters Patent is hereby corrected as shown below:

Column 2,
Line 29, delete the "(i)" and insert in place thereof -- (ii) --.

Column 10,
Line 40, delete the word "polyurethae" and insert in place thereof -- polyurethane --.

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,416,856 B1 Page 1 of 1
APPLICATION NO. : 08/797062
DATED : July 9, 2002
INVENTOR(S) : Crandall It is certified that error appears in the above-identified patent and that said Letters Patent is hereby corrected as shown below:

On the title page,
Item (*) delete "0" and insert --1246--.

Signed and Sealed this

Fifth Day of December, 2006

JON W. DUDAS
*Director of the United States Patent and Trademark Office*